Dec. 27, 1966   A. L. GIRARDI   3,294,216
EXTENSIBLE CONVEYOR
Filed March 25, 1964
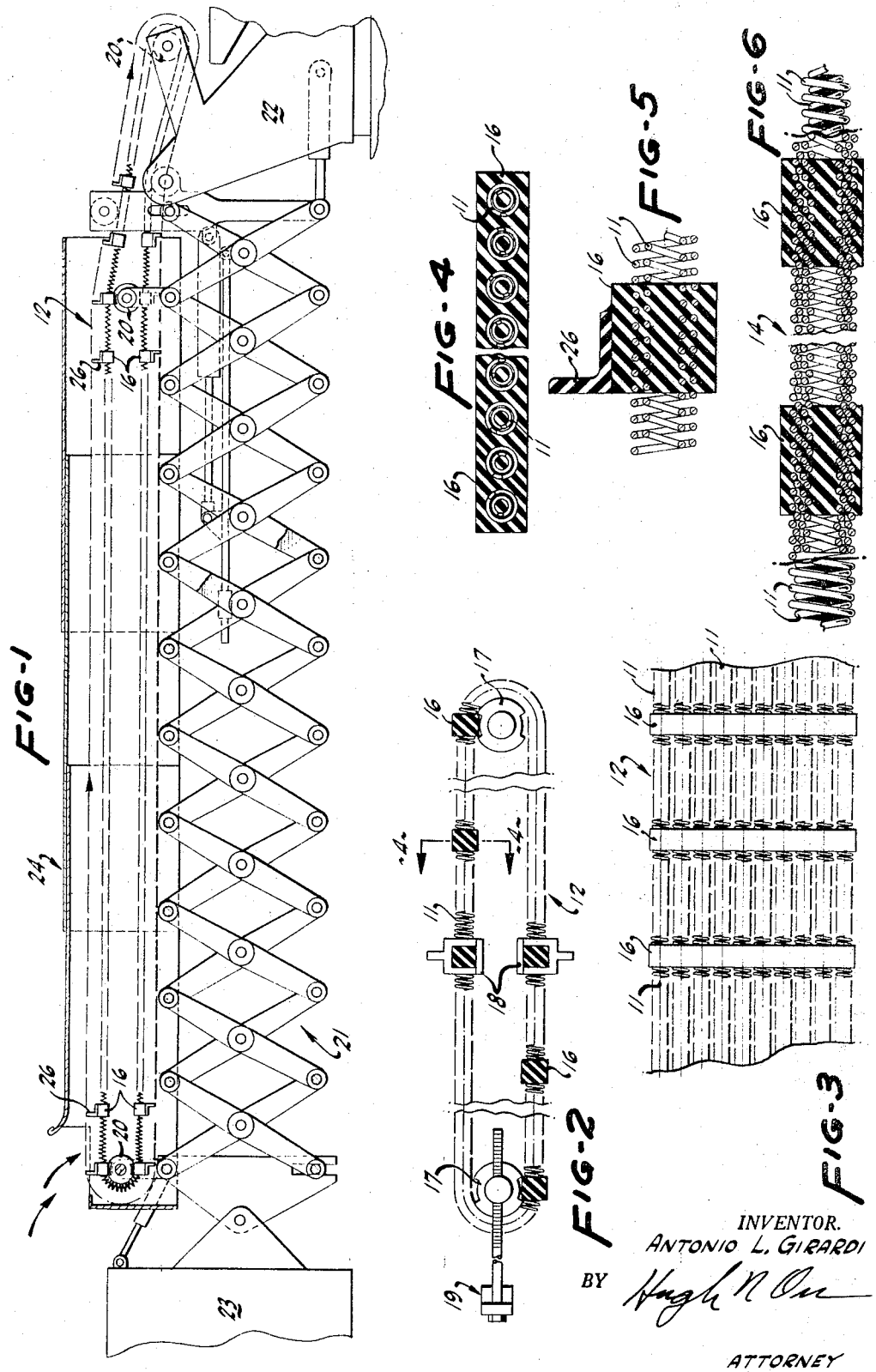
INVENTOR.
ANTONIO L. GIRARDI
BY
ATTORNEY

United States Patent Office 3,294,216
Patented Dec. 27, 1966

---

3,294,216
EXTENSIBLE CONVEYOR
Antonio Lawrence Girardi, Rte. 3, Box 324,
Stockton, Calif. 95205
Filed Mar. 25, 1964, Ser. No. 355,532
5 Claims. (Cl. 198—139)

This invention relates to improvements in extensible conveyors.

While the conveyor of the present invention is useful for numerous purposes in many fields of utility, it is particularly useful in connection with the extensible booms of orchard apparatus of the character disclosed in my prior Patents No. 2,798,623 and No. 2,927,705.

It is among the objects of the present invention to provide a conveyor which is extensible to accommodate itself to a wide range of extension and retraction of its course without need for auxiliary take-up mechanism.

It is also an object of the invention to provide an extensible conveyor belt which may be extended and retracted through a wide variation of length without materially affecting its width.

Another object is to provide an extensible conveyor formed of a plurality of coil springs longitudinally extensible through a wide range, and in which the coils are effectively held in substantially uniformly laterally spaced relation regardless of the longitudinal extension of the conveyor.

Further objects of the invention include the provision of new and improved features of construction and arrangement which afford advantages in manufacture, installation and use.

I accomplish these and other objects, some of which with the foregoing will be more fully explained in the following specification, by means of the device shown in the drawings forming a part of this specification and the method described herein. The invention of course is not limited to the embodiments illustrated and described, as the invention may be otherwise embodied and practiced within the scope of the appended claims.

In the drawings:

FIG. 1 is a fragmental side elevational view showing an extensible conveyor embodying the present invention as applied to an extensible boom such as employed in mobile orchard apparatus, portions of the apparatus being broken away and portions being shown in section.

FIG. 2 is a fragmental side elevational view, partly in vertical section, illustrating in diagrammatic form the structure and method of the present invention.

FIG. 3 is a fragmental plan view of a portion of the conveyor of the present invention.

FIG. 4 is a broken transverse sectional view of the conveyor, the section being taken through a bonding member upon the plane indicated by the line 4—4 of FIG. 2.

FIG. 5 is a sectional detail view illustrating the manner in which doubled intermeshing portions of coil spring are embedded in a molded cross member.

FIG. 6 is a fragmental detail view, partly in vertical section illustrating the intermeshing ends of a doubled length of coil spring and the molded cross members by which the ends are secured in loop forming interlocking engagement.

In terms of broad inclusion the present invention relates to an extensible conveyor belt comprising a plurality of coil springs each having its end portions joined to form an endless loop, a plurality of such loops being assembled in parallel relation by means of a plurality of cross members attached to the several springs at intervals along the length thereof to securely hold the loops in relatively close lateral proximate relation without materially limiting longitudinal extension and retraction of the springs to length and shorten the loops as desired. The end portions of each spring may be intermeshed to join the ends together to form a loop and cross members engaging the meshed end portions prevent separation of the ends when the loops are extended.

In terms of greater detail, the extensible conveyor of the present invention, as illustrated in the accompanying drawings, comprises a plurality of coil springs 11 positioned in laterally proximate and longitudinally parallel relation, as indicated in FIG. 3 of the drawings. Each spring 11 comprises a length of coil spring of appropriate length having one end pressed into intermeshing relation with the opposite end of the length to form an endless loop 12. The length and weight of the coil spring may of course be varied widely to suit various conditions. If desired a single length of coil spring may be doubled upon itself with the turns of one-half the spring intermeshing with turns of the other half to provide a double spring affording increased strength without materially limiting the extensibility of the spring 15 as shown in FIG. 5. The end portions of such doubled spring will intermesh to provide what may be termed a four-ply joint along the portion where the ends are joined to form an endless loop, as best indicated at 14 in FIG. 6 of the drawings.

The several coil spring loops are connected in side-by-side longitudinally parallel relation by means of cross members 16 connected to the springs at intervals along the length thereof. Preferably the cross members 16 are formed of rubber or equivalent material, molded onto the springs at substantially regular intervals along the lengths of the springs. At least one cross member 16 is applied to engage the interlocking ends of each coil spring loop.

In manufacture, a plurality of loops 12, formed as above explained, are placed upon supporting hubs 17 with the loops in slightly spaced parallel relation. A suitable mold 18 is positioned over one or both reaches of the conveyor loops, as indicated somewhat diagrammatically in FIG. 2. Moldable material, such as rubber, is injected into the mold to form the cross members 16 in which the springs 11 are embedded. Preferably the spring loops are extended to a moderate degree before the cross members 16 are molded thereonto, so as to minimize stress upon the embedding material when the springs are fully extended in service. For this purpose, the springs may be stretched by any suitable extending mechanism 19, as diagrammatically indicated in FIG. 2.

In service, the conveyor may be mounted for operation over pulleys 20 which are arranged to be moved to variously spaced positions for lengthening and shortening the conveyor as desired. As the pulleys 20 are moved apart, the coil spring loops 12 are stretched, and as the pulleys are moved toward each other the loops contract to accommodate the change in spacing.

While the conveyor is adapted for general purposes, it is particularly adapted for use upon an extensible boom 21 such as utilized in orchard apparatus of the character illustrated in my prior patents above referred to. In FIG. 1 of the drawings, the conveyor is shown mounted to extend from a point over the mounting base 22 upon which such a boom 21 is supported to a platform and cage 23 mounted at the outer end of the boom. As illustrated, the boom is in an extended position, and the conveyor is mounted above the boom and is substantially enclosed from above by a telescoping housing 24.

In this connection, the spring loops 12 extend and contract with the boom in any position of vertical or horizontal adjustment. The springs are sufficiently extensible to reach to the outermost end of the boom when the boom is extended to its outermost limit. When so extended, the several spring loops are retained with their longitudinal axes in predetermined spaced relation, and with no material variation in the spacing between the coils throughout the range of extension. The cross members 16 are positioned at intervals such as to prevent displacement of the springs laterally by the weight of fruit carried thereon so as to prevent fruit from being crowded between the springs. Baffles 26 are provided upon the cross members 16 to advance the fruit with the conveyor. Thus, when the boom is elevated, the baffles will prevent fruit from rolling down the conveyor. When the boom is level or only slightly inclined, the baffles serve to advance the fruit with the conveyor. The baffles 26 may be molded with the cross member 16, or they may be bolted, cemented or otherwise secured thereto after the molding operation. The spacing of the cross members 16 and the height of the baffles 26 may of course be varied to conform to the needs of any particular service which may be desired.

Having thus described my invention, I claim:

1. An extensible conveyor belt for apparatus provided with an extensible conveyor frame comprising a plurality of frame sections movable longitudinally relative to each other through a wide range of movement between fully retracted and fully extended positions and having pulleys mounted upon opposite ends of the conveyor frame for movement by and with the conveyor frame sections in conformity with extending and retracting movements thereof, said conveyor belt comprising a plurality of elastic members adapted to operate over the pulleys, said elastic members being disposed in laterally proximate and longitudinally parallel relationship and being extensible by and with the conveyor throughout the range of relative movement of the frame sections thereof, and transversely disposed cross members secured to the elastic members at spaced points along the length of the conveyor for holding said elastic members in fixed lateral proximity while permitting longitudinal extension and retraction of the elastic members in conformity with lengthening and shortening movements of the conveyor frame sections.

2. An extensible conveyor belt as defined by claim 1, wherein the extensible elastic members comprise coil springs which will stretch and retract in conformity with movements of the conveyor frame sections throughout their range of relative movement.

3. An extensible conveyor belt as defined by claim 1 wherein the elastic members comprise coil springs and the transversely disposed cross members are formed of moderately elastic and resilient material of the character of rubber molded onto the springs with the springs embedded therein in a partially extended condition.

4. An extensible conveyor belt as defined by claim 1 wherein the elastic members are formed of lengths of coil spring material each of which lengths has an end portion at one end thereof meshed with the opposite end portion of the length to interlockingly secure the ends together in endless loop forming relation.

5. An extensible conveyor belt as defined by claim 1 wherein the elastic members comprise endless coil springs each formed of a length of spring material having end portions interlockingly meshed one with the other to secure the ends together in endless loop forming relation and in which the interlocking end portions of each loop are bound together by at least one of the cross members.

References Cited by the Examiner
UNITED STATES PATENTS

| | | | |
|---|---|---|---|
| 241,494 | 5/1881 | Jarolimek | 74—238 |
| 924,324 | 6/1909 | Dalton | 74—238 |
| 1,214,911 | 2/1917 | Granz | 74—238 |
| 2,803,504 | 8/1957 | Lynch | 198—193 |
| 2,857,042 | 10/1958 | Gaubert | 198—190 |

EVON C. BLUNK, *Primary Examiner.*
RICHARD E. AEGERTER, *Examiner.*